United States Patent [19]

Peschel et al.

[11] 3,853,275

[45] Dec. 10, 1974

[54] FILM THREADING DEVICE FOR A MOTION PICTURE PROJECTOR

[75] Inventors: Heinz Peschel, Stgt. Zuffenhausen; Manfred Radtke, Korb, both of Germany

[73] Assignee: Eastman Kodak Company, Rochester, N.Y.

[22] Filed: Mar. 15, 1973

[21] Appl. No.: 341,435

[30] Foreign Application Priority Data
July 26, 1972 Germany ..................... 2231130

[52] U.S. Cl. .................. 242/195, 226/91, 242/205, 242/210, 352/158
[51] Int. Cl. ........................................... G03b 1/58
[58] Field of Search ........... 242/195, 192, 197, 210, 242/208, 205; 352/158, 157, 72, 78 R; 226/91, 92

[56] References Cited
UNITED STATES PATENTS

| | | | |
|---|---|---|---|
| 3,333,783 | 8/1967 | Guernet | 242/195 |
| 3,337,146 | 8/1967 | Miyauchi et al. | 242/208 |
| 3,724,777 | 4/1973 | Martin et al. | 242/210 |

*Primary Examiner*—George F. Mautz
*Attorney, Agent, or Firm*—John Morrow

[57] ABSTRACT

A film threading device for a motion picture projector includes a hook-shaped member for engaging a perforation in a leading end of a received film for feeding the film to a film transport mechanism of the projector. The threading device includes cams which, upon actuation of a threading switch, move the hook-shaped member towards the film roll, stop the member in position to engage the film roll and then move the member to deliver the film to the film transport mechanism of the projector whereupon the film threading device is automatically disengaged from the projector drive means and the drive means is switched off.

4 Claims, 3 Drawing Figures

FILM THREADING DEVICE FOR A MOTION PICTURE PROJECTOR

CROSS-REFERENCE TO RELATED APPLICATIONS

Reference is made to commonly assigned copending U.S. Pat. application Ser. No. 250,940 entitled, "Threading Device" filed May 8, 1972, in the name of Clemens Hopfner et al.

BACKGROUND OF THE INVENTION

1. Field of the Invention

The invention relates to a motion picture projector with a film threading device which, by means of a hook-shaped member, engages a perforation provided in the leading end of a received film in order to feed the film to the film transport means arranged on the projector. The threading device is controlled by a cam actuated switch arrangement which automatically switches off the threading device after a single revolution of the cam.

2. Description of the Prior Art

A device of this general type is disclosed in German Patent Number 1,812,211 (corresponding to U.S. Pat. No. 3,604,657) where a hook member is mounted on a guide plate and is movable from a retracted position towards the film via an inclined guide path. During such movement, a switch is actuated to turn on a motor to drive the film reel contrary to the direction of film transport. The projecting hook member engages with a perforation near the end of the film and holds the film contrary to the rotational force of the drive motor. The film end is then fed to the film transport means provided on the projector by further movement of the hook member. Then the hook member is disengaged and returned to the initial retracted position under the action of a spring, and the drive motor is switched off. The film transport rollers provided on the projector are driven and actuated by separate means. The device disclosed in such patent is especially adapted for engaging the leading end of the film and for moving it over a short distance, an additional drive motor being required for rotating the film reel. The device disclosed in that patent does not provide automatic and complete control of the film threading operation up to the stage where the film is ready for projection.

A control apparatus for the threading of the film in a cartridge projector is known from German Patent Number 2,019,281. When, after switching the apparatus on, drive means are set in motion, film withdrawal means is moved toward the film the film is threaded, and moved through the projector. At the end of the projection, the film drive means are automatically reversed to rewinding by tension in the film. After rewinding, the drive means are immediately reversed to forward projection, the transport carriage for a plurality of cartridges is advanced so that film from a new cartridge can be threaded. This apparatus is chiefly intended for an uninterrupted, fully automatic projection of a sequence of several films. The apparatus includes complex technical means which are susceptible to trouble and are not necessary for the projection of single films. Also, the film withdrawal means uses a friction roller which does not permit reliable engagement with the leading end of the film.

SUMMARY OF THE INVENTION

It is an object of this invention to automatically control the threading of the film into a motion picture projector and to insure reliable engagement of the leading end of the film during this operation.

Another object of the present invention is to provide a device which consists of few space-saving parts which permits reliable control of the threading functions and a safe engagement of the leading end of film received in a cartridge and of film on a reel.

Another object is to provide a threading device in which the sequence of functions during the threading operation is controlled automatically and independently of the film transport, the film being ready for projection following threading.

Another object of this invention is that the threading hook member is adapted to travel a considerable distance over which is reliably moves the film from a cartridge or a film reel to the film transport means of the projector, without special film guide means being required.

According to a preferred embodiment, an improvement is provided for an apparatus which includes supporting means and advancing means for receiving and advancing an elongate strip material having an opening in the leading end thereof, and which also includes a hook member movably supported for movement by drive means between, (1) a withdrawn position wherein the hook member is remote from said strip, (2) an engaging position wherein the hook member is closely adjacent to the loading end of the film strip to engage the leading end through the opening, and (3) a threading position wherein the hook member releases the leading end to the advancing means. The improvement comprises: (a) a cam rotatably supported by the apparatus, (b) switch means movable between (i) a first condition wherein the switch means is effective to cause the drive means to move the hook member, and (ii) a second condition wherein the switch means is ineffective to cause the drive means to move the hook member, and (c) means connecting the cam and the switch means to cause the switch means to be moved between the second condition and the first condition and to hold the switch means in the first condition at least during one revolution of the cam.

The invention and its objects and advantages will become more apparent in the detailed description of the preferred embodiment presented below.

BRIEF DESCRIPTION OF THE DRAWINGS

In the detailed description of the preferred embodiment of the invention presented below, reference is made to the accompanying drawings, in which.

DESCRIPTION OF THE PREFERRED EMBODIMENT

Because motion picture projectors are well known, the present description will be directed in particular to elements forming part of, or cooperating more directly with the present invention, apparatus not specifically shown or described herein being understood to be selectable from those known in the art.

Figure 1:
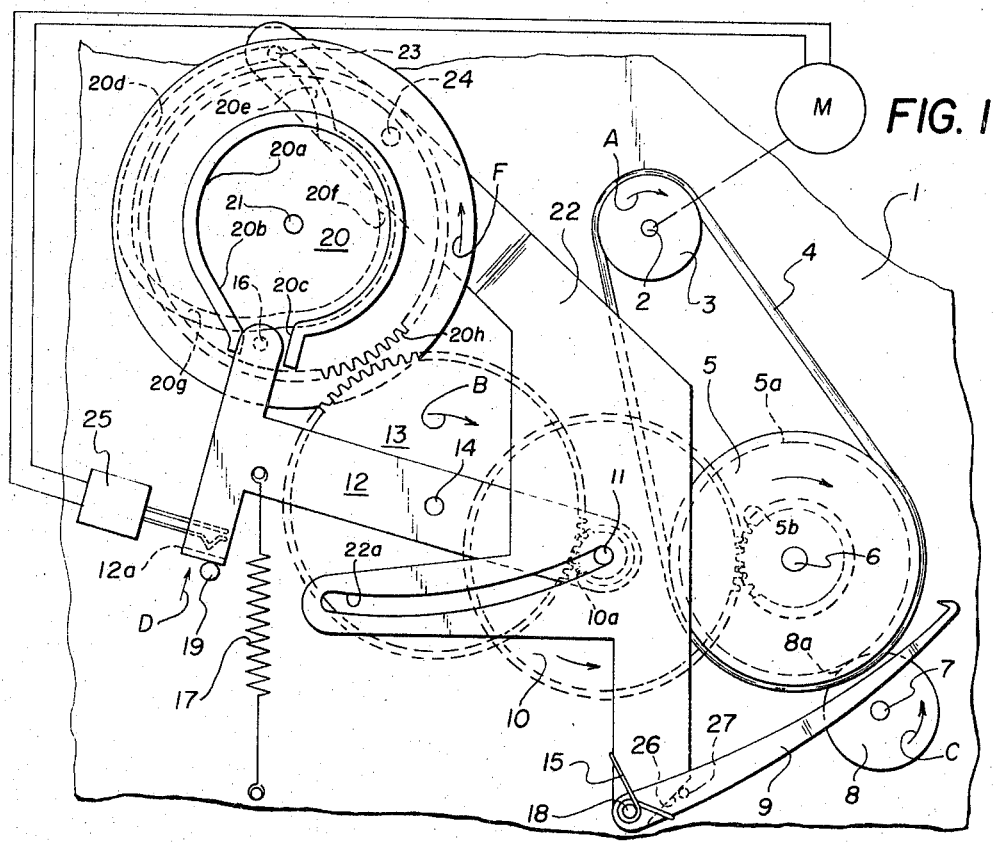
FIG. 1 shows a fragmentary view of the present invention when the mechanism is in its initial rest position.
Figure 2:
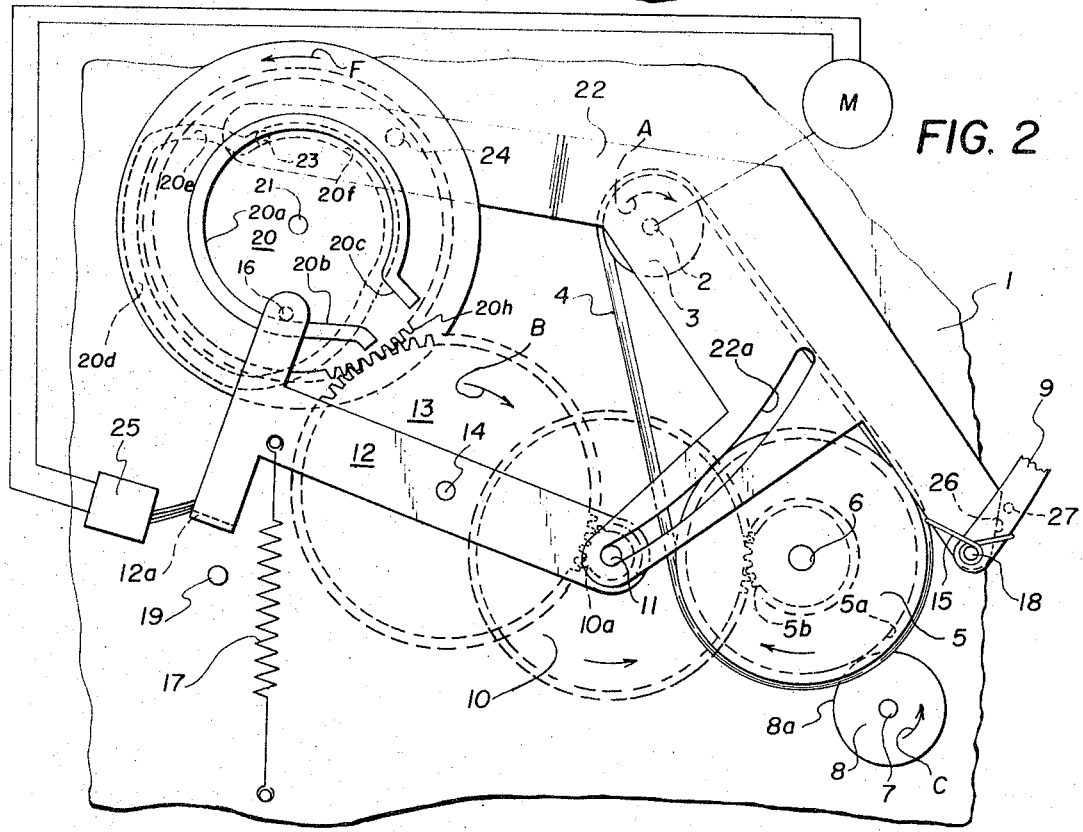
FIG. 2 is a view similar to FIG. 1 showing the device when it is in threading position.

The device will now be described in more detail with reference to FIGS. 1 and 2. A driving shaft 2 is rotatably mounted on a mounting plate 1. This shaft is firmly connected to a pulley 3 which is driven by the shaft in the direction of the arrow "A," by means of a motor M shown schematically. The rotation is transmitted by a belt 4 to the drive gear 5 mounted for rotation about a shaft 6, said drive gear including a groove forming a pulley at its outer diameter and being provided with a driving surface 5a and gear teeth 5b. The driving surface 5a of the drive gear 5 contacts a driving surface 8a on a drive roller 8 to drive the film therebetween, whereas the teeth 5b of the drive gear 5 mesh with the gear 10 which in turn meshes via its teeth 10a with a gear 13.

The gear 13 is mounted on a lever 12 for rotation about a shaft 14, and the lever 12 is pivotable about a shaft 11 on which gear 10 is also mounted. The lever 12 is biased by a spring 17 contrary to the direction of the arrow "D" and in its initial position (FIG. 1) rests with a bent portion 12a against a pin 19. Through portion 12a, the lever 12 also cooperates with a normally open switch 25 which is connected to the drive motor M through known circuitry. On the lever 12, a cam follower 16 is arranged which cooperates with a cam 20a of a rotor 20. Depending on the position of the lever 12, the gear 13 either meshes with the teeth 20h of the rotor 20 (FIG. 2) or is positioned directly in front of the teeth 20h (FIG. 1).

The rotor 20 is mounted for rotation about a shaft 21 and comprises on its plane side opposite to the cam 20a another cam 20d, e, f, g in which a pin 23 of an arm 22 is guided. The arm 22 is pivotally mounted about a pivot 24 arranged on the mounting plate 1 and is guided in a guide slot 22a at the shaft 11. A threading hook 9 is pivotally mounted about pin 18 on the arm 22 and under the action of a spring 15 is held with its pin 27 in contact with the arm 22.

Now describing the operation of the device in greater detail, the lever 12 is moved in the direction of the arrow "D" either manually or by suitable control means (not shown). This causes the switch 25 to be closed by the bent portion 12a and the projector drive means to be started so that the gear 13 rotates in the direction of the arrow "B." When the lever 12 is further pivoted, the gear 13 is brought into engagement with the teeth 20h of the rotor 20 so that the rotor rotates in the direction of the arrow "F" (as indicated in FIG. 2). In this position of the lever 12, cam follower 16 is drawn into the cam 20a by the sloping entrance section 20b and held by the concentric cam portion 20a during one revolution of the rotor.

During this revolution of the rotor in the direction of the arrow "F," the movement of the threading hook 9 is controlled, the pin 23 being so moved by the cam portion 20e that the arm 22 and the threading hook 9 are moved in the direction of the arrow "E" (see FIGS. 2 and 3) until the threading hook 9 is located within the cartridge 28. Via the projector drive means, the film reel of the cartridge 28 is driven in a known manner by means of a friction clutch contrary to the direction of film transport so that the leading film end 29 is first moved towards the threading hook 9 until a preferably separate perforation in the leading film end is caught by the threading hook 9 whereby the film roll and the film reel of the cartridge are arrested. During this engagement operation, the threading hook 9 is controlled by the concentric cam portion 20f of the rotor 20 to remain in the gripping position.

Figure 3:
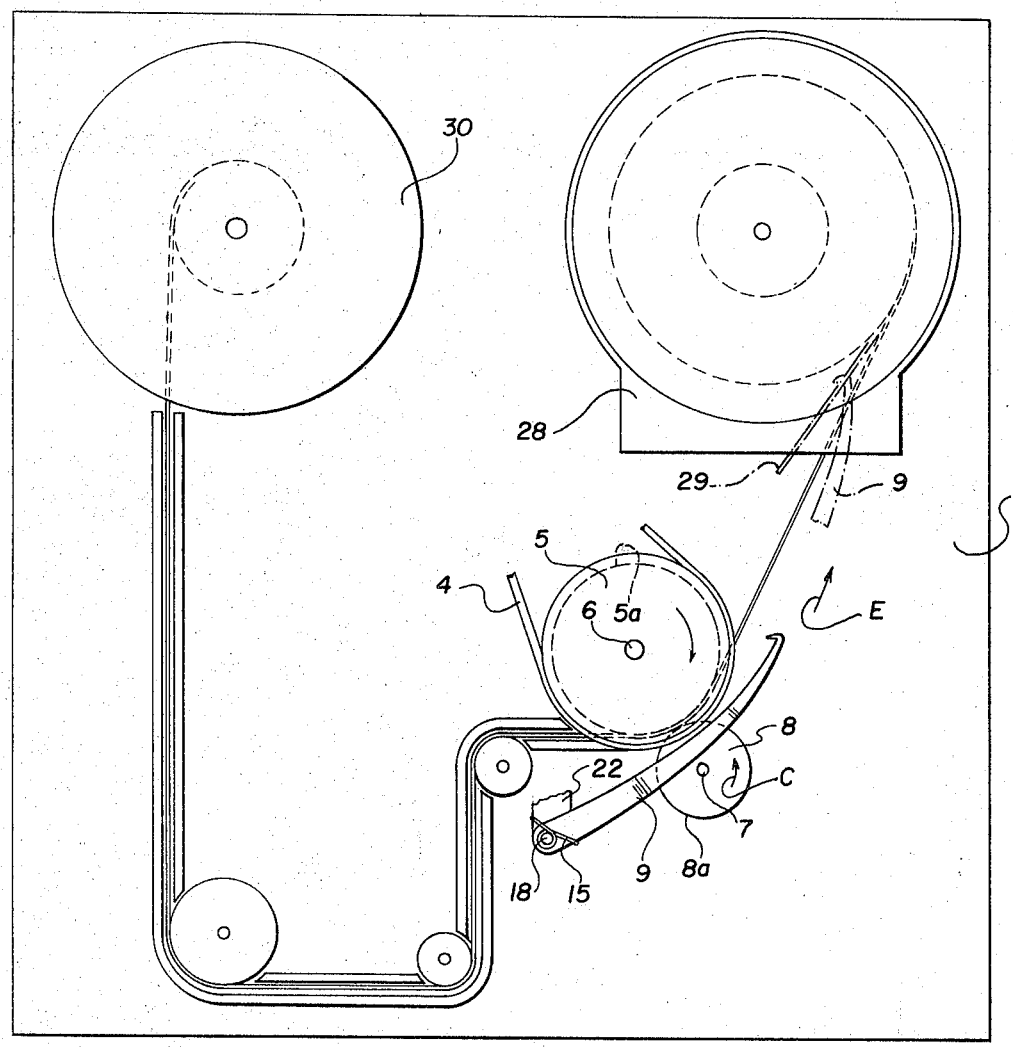
FIG. 3 is a schematic view, showing the film path of the projector which leads from a received cartridge to the takeup reel.

Now the pin 23 of the arm 22 moves into the cam portion 20g and the arm 22 is pivoted contrary to the direction of the arrow "E." During this movement, the threading hook 9 withdraws the leading film end 29 from the cartridge 28 and moves it between the drive roller 8 and the drive gear 5 which both engage it for further transport. While the film transport claw is in its retracted position, the film 29 is then shifted through the film guide means, until it is engaged by the film take-up reel 30 (FIG. 3). During this phase, the pin 23 of the arm moves along the concentric cam portion 20d, whilst the arm 22 and thus also the threading hook 9 stand still. When the film 29 is brought into engagement with the rollers 5 and 8, it is tensioned and is thus disengaged from the threading hook 9 (FIG. 3).

When the leading film end 29 has been engaged by the take-up reel 30, the cam portion 20a has rotated to a point where the cam follower 16 of the lever 12 can slide off the cam edge 20c. Under the action of spring 17, the lever 12 moves contrary to the direction of the arrow "D," actuates the switch 25 to switch off the projector drive means, and lever 12 is then returned to its initial position as shown in FIG. 1. The film has now been completely threaded and is ready for projection. By actuation of a switch, the roller 8 is lifted off the film via means not shown, and the film is transported for the purpose of projection by the film transport claw which has now been brought into its operative position.

The invention and its objects and advantages has been described in detail with particular reference to a preferred embodiment thereof, but it will be understood that variations and modifications can be effected within the spirit and scope of the invention.

We claim:

1. In an apparatus having supporting means and advancing means for receiving and advancing an elongate strip material having an opening in the leading end thereof, said apparatus having threading means which includes a hook member movably supported by said apparatus and having drive means for moving said hook member between, (1) a withdrawn position wherein said hook member is remote from said strip, (2) an engaging position wherein said hook member is closely adjacent to said opening in said leading end of a received strip to engage said leading end through said opening, and (3) a threading position wherein said hook member releases said leading end to said advancing means, the improvement comprising:
   a. a cam rotatably supported by said apparatus;
   b. switch means movable between, (1) a first condition wherein said switch means is effective to cause said drive means to move said hook member, and (2) a second condition wherein said switch means is ineffective to cause said drive means to move said hook member; and
   c. means connecting said cam and said switch means to cause said switch means to be moved between said second condition, and said first condition and to hold said switch means in said first condition at least during one revolution of said cam.

2. In a motion picture projector including means for supporting a received roll of film having a leading end with a perforation therein and including transport means arranged for receiving the leading end of the received film and transporting the film through the projector, the improvement comprising:
 a. a hook member for engaging said perforation in the leading end of the received film and for threading the film to the transport means;
 b. drive means for moving the hook member between, (1) a withdrawn position wherein said hook member is remote from said film strip, (2) an engaging position wherein said hook member is closely adjacent to said perforation in said leading end of received film strip to engage said leading end, and (3) a threading position wherein said hook member releases said leading end to said advancing means, said drive means including: an electrical circuit, an electric motor connected in said circuit, and a first cam member driven by said electric motor for moving said hook member;
 c. means for controlling said drive means, said control means including: an electrical switch connected to said electrical circuit for completing said circuit when said switch is closed, a contact assembly for opening and closing said electrical switch; and
 d. a second cam member for cooperating with said contact assembly for causing said switch to be closed during one revolution of said second cam member.

3. A projector as set forth in claim 2 wherein said first cam member includes a generally cylindrical lip defining an inner surface having a portion of the lip removed to define an opening in the lip such that a portion of said contact assembly can be moved through the opening and follow said inner surface during the revolution of said first cam member, the contact assembly closing said electrical switch when said portion of the contact assembly follows said inner surface during the revolution of said first cam.

4. A threading apparatus for a motion picture projector having supporting means for a received roll of film having an opening near the leading end, said apparatus comprising:
 a. a frame;
 b. film advancing means secured to said frame;
 c. drive means supported by said frame;
 d. first and second cams rotatably supported by said frame, said cams operatively coupled to said drive means;
 e. linkage supported by said frame, said linkage including a cam follower portion for following said first cam to cause said linkage to be driven;
 f. a hook member carried by said linkage, said hook member movable between, (1) a withdrawn position wherein said hook member is remote from said rilm strip, (2) an engaging position wherein said hook member is closely adjacent to said perforation in said leading end of received film strip to engage said leading end, and (3) a threading position wherein said hook member releases said leading end to said advancing means; and
 g. control means coupling said second cam and said drive means for causing said drive means to be operable through at least one complete revolution of said second cam.

* * * * *